US007617495B2

(12) United States Patent
Muthukumar et al.

(10) Patent No.: US 7,617,495 B2
(45) Date of Patent: Nov. 10, 2009

(54) RESOURCE-AWARE SCHEDULING FOR COMPILERS

(75) Inventors: Kalyan Muthukumar, Karnataka (IN);
Daniel M. Lavery, Santa Clara, CA (US); Gerolf F. Hoflehner, Santa Clara, CA (US); Chu-cheow Lim, Santa Clara, CA (US); Jean-Francois Collard, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 954 days.

(21) Appl. No.: 10/809,716

(22) Filed: Mar. 24, 2004

(65) Prior Publication Data

US 2005/0216899 A1  Sep. 29, 2005

(51) Int. Cl.
*G06F 9/45* (2006.01)
(52) U.S. Cl. ...................................................... 717/161
(58) Field of Classification Search ................. 717/156, 717/161; 712/245; 718/103; 370/235
See application file for complete search history.

(56) References Cited

U.S. PATENT DOCUMENTS 5,809,308 A * 9/1998 Tirumalai .................... 717/161

7,007,271 B2 * 2/2006 Kumar et al. ................ 717/151
7,302,685 B2 * 11/2007 Binns et al. .................. 718/103

OTHER PUBLICATIONS

Devika Subramanian, Biographic porfolio data, pp. 1-17.*
"An Experimental Evaluation of List Scheduling", Sep. 1998, TR98-326, rice.edu, pp. 1-15.*
Bharadwaj et. al, "The Intel IA-64 Compiler Code Generator", IEEE 0272-1732/00, 2000.
Kastner and Winkel, "ILP-based Instruction Scheduling for IA-64", Proceedings of the ACM SIGPLAN Workshop on Languages, Compilers and Tools for Embedded Systems, Utah, 2001, ACM 1-58113-425-Aug. 1, 2006.
K. Cooper et al., "An Experimental Evaluation of List Scheduling", Department of Computer Science, Rice University, Houston, Texas, Sep. 1998.
Deitrich et. al, "Speculative Hedge: Regulating Compile-Time Speculation Against Profile Variations," Proceedings of the 29th Annual International Symposium on Microarchitecture, Dec. 2-4, pp. 70-79, 1996.

* cited by examiner

*Primary Examiner*—Tuan Anh Vu
(74) *Attorney, Agent, or Firm*—Blakely, Sokoloff, Taylor & Zafman LLP

(57) ABSTRACT

Disclosed are embodiments of a compiler, methods, and system for resource-aware scheduling of instructions. A list scheduling approach is augmented to take into account resource constraints when determining priority for scheduling of instructions. Other embodiments are also described and claimed.

24 Claims, 11 Drawing Sheets

RESOURCE-AWARE SCHEDULING FOR COMPILERS

BACKGROUND

1. Technical Field

The present disclosure relates generally to information processing systems and, more specifically, to resource-aware scheduling of instructions.

2. Background Art

A compiler is a software program that translates a source program (referred to herein as "source code") into machine instructions (referred to herein as "object code") that can be executed on a hardware processor. The source code is typically written in a high-level programming language such as C, C++, Microengine C, Pascal, FORTRAN, or the like.

When generating object code, a compiler operates on the entire source program as a whole. This is in contrast to, for example, interpreters that analyze and execute each line of source code in succession. Because compilers operate on the entire source program, they may perform optimizations that attempt to make the resultant object code more efficient. Optimizing compilers attempt to make the object code more efficient in terms of execution time and/or memory usage. Examples of optimizing compilers include the Intel® C Compiler, Intel® C++ Compiler, and the Intel® Fortran Compiler.

An optimizing compiler may generate an intermediate representation of the source code. For a single compiler engine that is designed for more than one source code language (such as, for instance, a single compiler engine for C, C++, and FORTRAN90), the compiler may generate a common intermediate representation, so that many of the optimization techniques are applicable irrespective of the source language.

A compiler typically includes a back end code generator that schedules instructions and generates the ultimate object code. The task of the code generator is to translate the optimized intermediate representation into machine code for the desired target processor. Because compilers translate source code into object code that is unique for each type of processor, many compilers are available for the same language. For those compilers whose target processor is an Intel® Itanium® processor, for example, the compiler is responsible for efficiently exploiting the available instruction-level parallelism of such processors, and for keeping the execution units of such processors as fully utilized as possible during each processing cycle.

Typically, scheduling of instructions is handled by the code generator according to a heuristic-based approach such as a list scheduling algorithm. In such approach, scheduling priorities for instructions are calculated based on their dependence height in a directed acyclic graph (DAG) that represents the scheduling region under consideration. Such a scheduling approach may fail to provide an optimal schedule for regions that are resource-bound rather than dependence-bound. The compiler and methods described herein address these and other issues associated with scheduling of instructions by a compiler.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of an apparatus, system and methods for resource-aware scheduling of instructions by a compiler.

DETAILED DESCRIPTION

Described herein are selected embodiments of a compiler, methods, and system for resource-aware scheduling of instructions. In the following description, numerous specific details such as specific processor architectures and resource constraints, example code sequences, compiler organization, and the like have been set forth to provide a more thorough understanding of the present invention. It will be appreciated, however, by one skilled in the art that the invention may be practiced without such specific details. Additionally, some well-known structures, circuits, and the like have not been shown in detail to avoid unnecessarily obscuring the present invention.

Disclosed herein are embodiments of resource-aware scheduling of instructions. When computing slack values for instruction scheduling, less than optimal scheduling may be realized if slack values take only instruction dependence into account. Disclosed are embodiments of an apparatus, methods and system that perform instruction scheduling by taking into account, not only dependence height, but also the available resources of a computing system.

Figure 1:
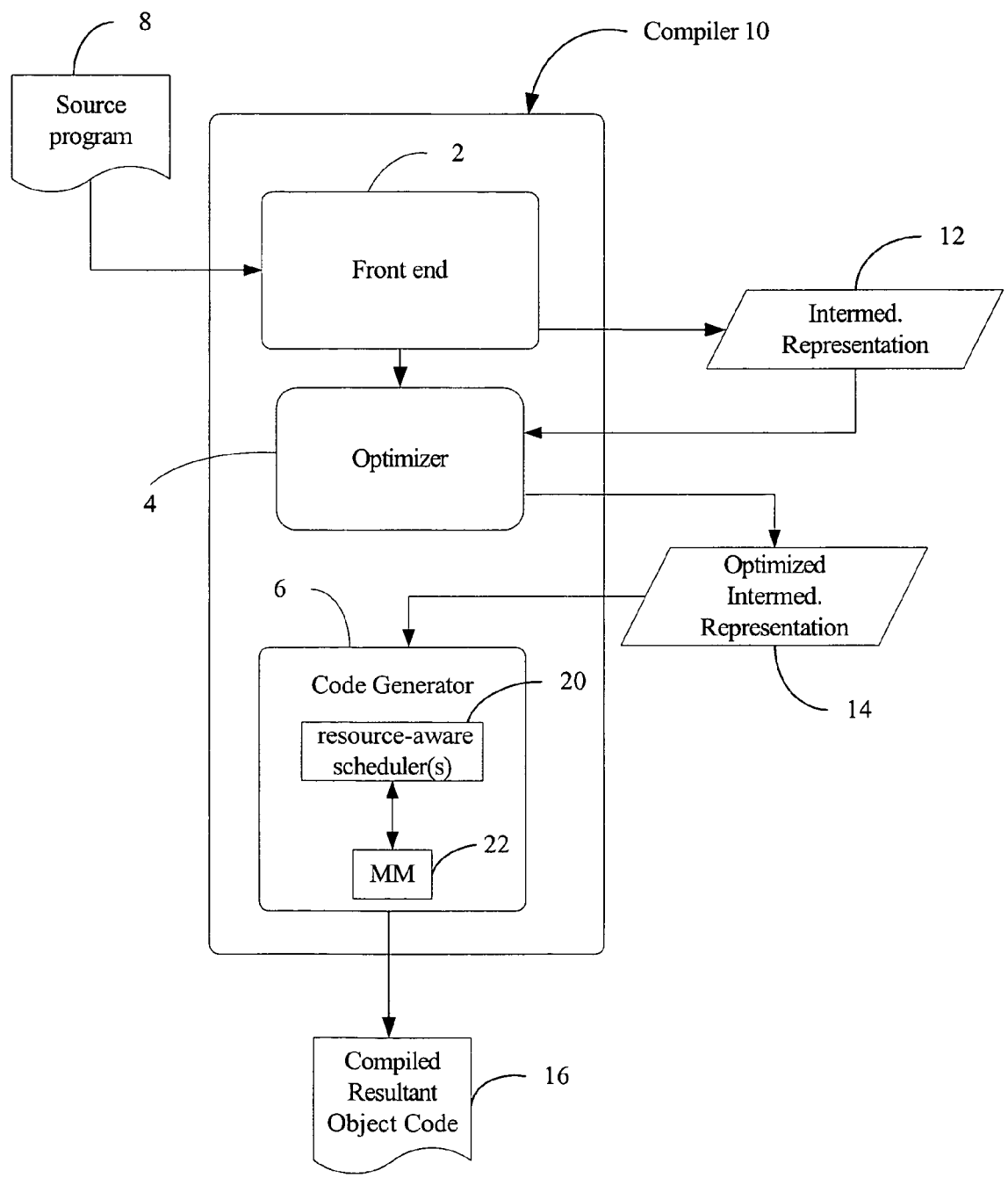
FIG. 1 is a data flow diagram of at least one embodiment of a compiler that includes one or more resource-aware schedulers.

FIG. 1 is a data flow diagram of a compiler having one or more resource-aware schedulers. FIG. 1 illustrates that the compiler 10 includes a front end 2, and a back end code generator 6. For at least one embodiment, the compiler 10 may also include an optimizer 4. The front end 2 may generate an intermediate representation 12 of a source program 8 in a known manner.

For at least one embodiment, the intermediate representation 12 may be optimized in one or more of various known manners (i.e., dead code elimination, partial redundancy elimination, single static assignment, loop invariance hoisting, etc.) to generate an optimized intermediate representation 14. Such optimization may be performed by the optimizer 4. It will be understood that the embodiments discussed herein may be performed on either optimized or non-optimized intermediate representation code. Accordingly, optimizer 4 is an optional feature.

The code generator 6 receives the optimized intermediate representation 14 as an input and generates compiled resultant object code 16. The code generator 6 may include one or more resource-aware schedulers 20. For at least one embodiment, the resource-aware scheduler(s) 20 may include both a global code scheduler and a fast local code scheduler. The resource-aware scheduler(s) 20 may also include a software-pipelining modulo scheduler. The resource-aware scheduler(s) 20 communicate with a machine model 22 that models a desired target processor.

At least one of the resource-aware scheduler(s) 20 may schedule instructions over acyclic regions of control flow, such as an extended basic block. For at least one embodiment, such scheduler 20 may be referred to as a global code scheduler.

At least one of the resource-aware scheduler(s) 20 may rearrange code within a basic block. For at least one embodiment, such resource-aware scheduler 20 may be referred to as a local code scheduler.

At least one embodiment of the resource-aware scheduler(s) 20 may schedule iterations of a loop such that the iterations overlap each other. For at least one embodiment, such resource-aware scheduler 20 may be referred to as a software-pipelining modulo scheduler.

As used herein, the term "resource-aware scheduler" is intended to encompass any or all schedulers within a compiler, including a global code scheduler, a local code scheduler, and/or a software-pipelining modulo scheduler.

Figure 2:
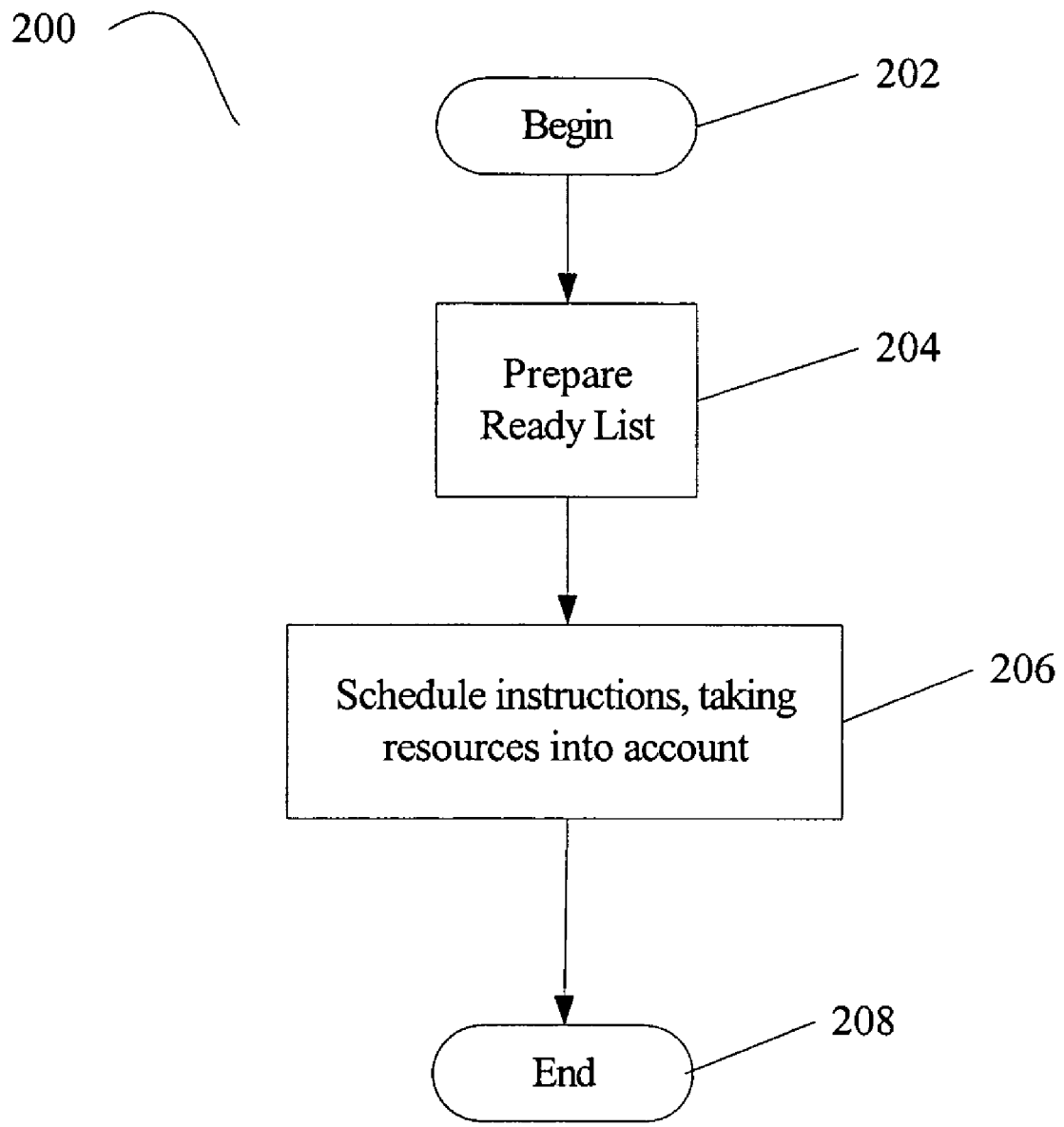
FIG. 2 is a flowchart illustrating at least one embodiment of a method for performing resource-aware instruction scheduling.

FIG. 2 is a flowchart illustrating at least one embodiment of a resource-aware scheduling method 200. The method 200 may be performed, for at least one embodiment, by the one or more resource-aware schedulers 20 (FIG. 1). FIG. 2 illustrates that the method 200 begins at block 202 and proceeds to block 204. One should note that, because the scheduling processing is assumed to start at cycle 0, the discussion below refers to the first cycle as cycle 0, the second cycle as cycle 1, and so forth.

At block 204 a ready list is prepared. The ready list is a list of those nodes of a (Directed Acyclic Graph) DAG, which represents the scheduling region, corresponding to instructions that are ready to be scheduled in the current cycle. In other words, the ready list represents those instructions that are candidates for scheduling during the current cycle. For at least one embodiment, preparation 204 of the ready list may include determining a slack value for each of the ready instructions based on resource constraints. (Such slack determination may also take other considerations into account, such as dependence constraints). The ready list may also, during ready list preparation 204, be sorted according to these resource-based slack values. Additional detail for at least one embodiment of ready list preparation 204 is discussed below in connection with FIGS. 3 and 4. From block 204, processing proceeds to block 206.

At block 206, the method 200 schedules instructions from the ready list. The method 200 takes resources into account in order to determine a scheduling priority and select instructions for scheduling. That is, the selection at block 206 of a ready instruction for scheduling takes into account the slack value that is based, at least in part, on resource constraints. As is mentioned above, for at least one embodiment the slack value may also take into account dependence constraints. From block 206, processing ends at block 208.

Figure 3:
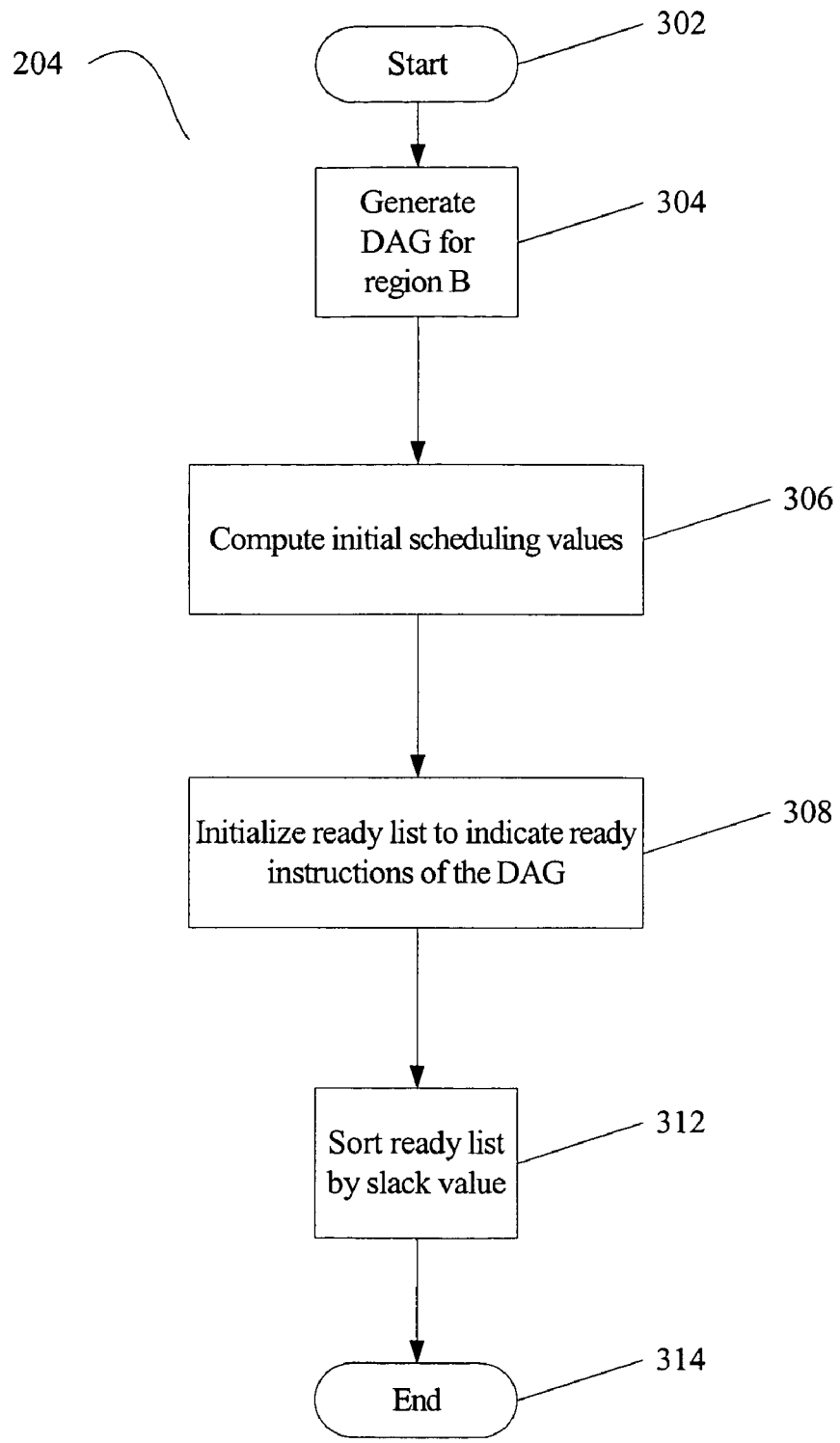
FIGS. 3 is a flowchart illustrating a method for preparing a ready list.

FIG. 3 is a flowchart illustrating further details of the ready list preparation 204 illustrated in FIG. 2. FIG. 3 illustrates that processing begins at block 302 and proceeds to block 304.

At block 304, a DAG is generated to represent the instructions of the scheduling region. The scheduling region may be an acyclic region of control flow. The DAG represents dependence relationships among the instructions of the scheduling region. Processing proceeds to block 306 from block 304.

At block 306, initial scheduling values are computed. These scheduling values include dependence height, resource height and minimum schedule length for the DAG. In addition, the initial scheduling values include instruction-specific values to facilitate computation of slack values for the instructions represented in the DAG for region B. These slack values take into account the resource heights of the instructions in order to reflect a scheduling priority for the instructions. From block 306, processing proceeds to block 308.

At block 308, a ready list is initialized to reflect those instructions of scheduling region B (as reflected in the DAG) that are ready for scheduling in the next cycle. Processing then proceeds to block 312.

At block 312, the entries of the ready list are sorted by their slack values. Such sorting results in a ready list whose "next" entry has the highest scheduling priority. Ready list preparation processing then ends at block 314.

Figure 4:
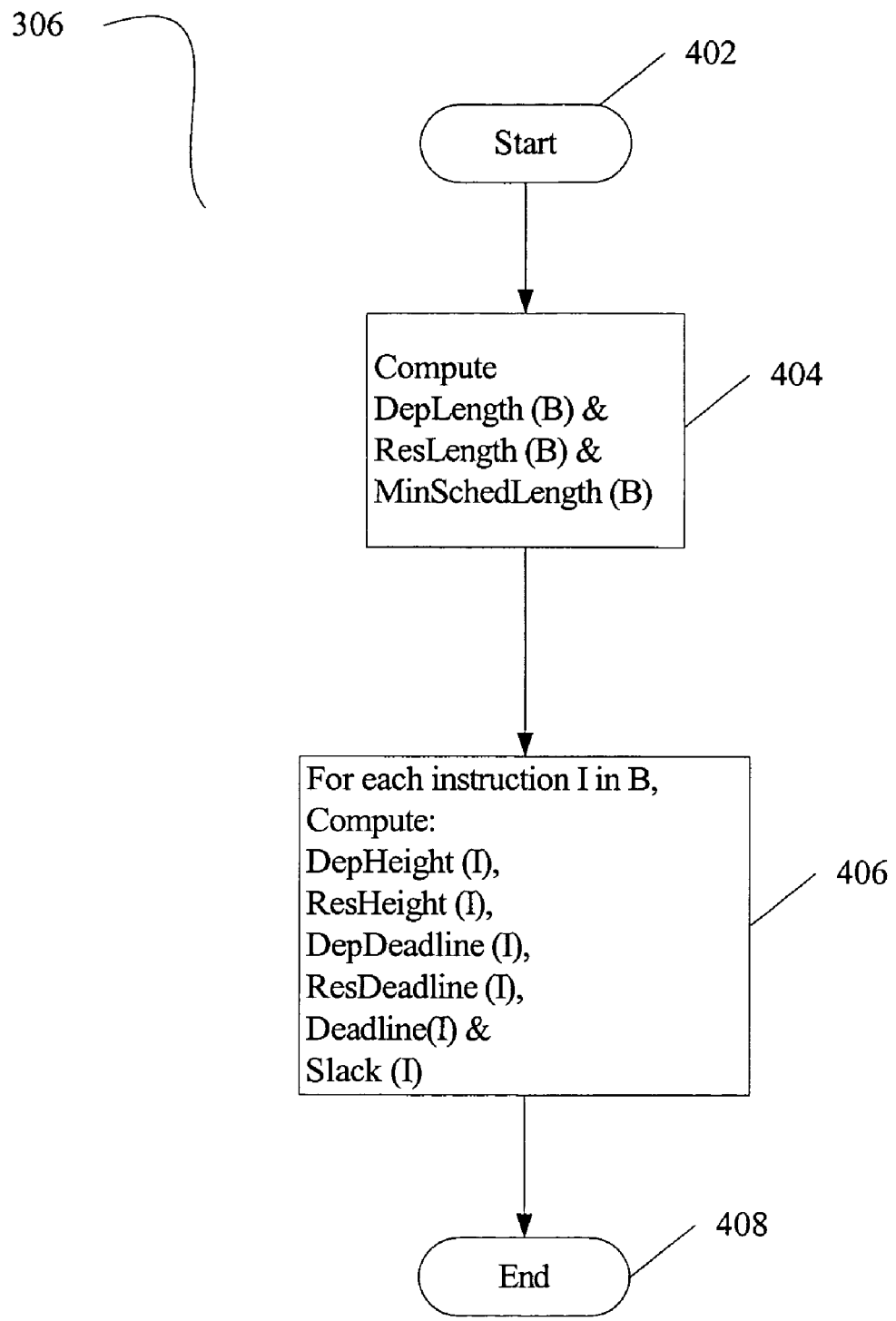
FIG. 4 is a flowchart illustrating a method for computing initial scheduling values.

FIG. 4 is a flowchart further illustrating at least one embodiment of the initial value computation 306 illustrated in FIG. 3. For at least one embodiment, the processing of FIG. 4 is performed during ready list preparation 204, shown in FIG. 2.

FIG. 4 illustrates that processing for the initial value computation 306 begins at block 402 and proceeds to block 404. At block 404, initial scheduling values are computed for the scheduling region B. FIG. 4 illustrates that the initial scheduling values for the scheduling region B that are computed at block 404 include the dependence length of the scheduling region ("DepLength(B)"), as well as the resource length of the scheduling region ("ResLength(B)") and the minimum schedule length of the scheduling region ("MinSchedLength (B)"). For at least one embodiment, MinSchedLength(B)= Max (DepLength(B), ResLength(B)).

The dependence length of the DAG ("DepLength(B)") indicates the number of cycles needed to schedule the instructions of the scheduling region, B. Dependence Length is calculated as the total height of the dependence graph, plus one: DepLength(B)=Total Height of Dependence Graph+1. Assume, for purposes of example, that region B includes the following instructions (written in pseudo code):

| Load | R1 = [A] |
| Load | R2 = [B] |
| Add  | R3 = R1 + R2 |
| ST   | [C] = R3 |

Figure 5:
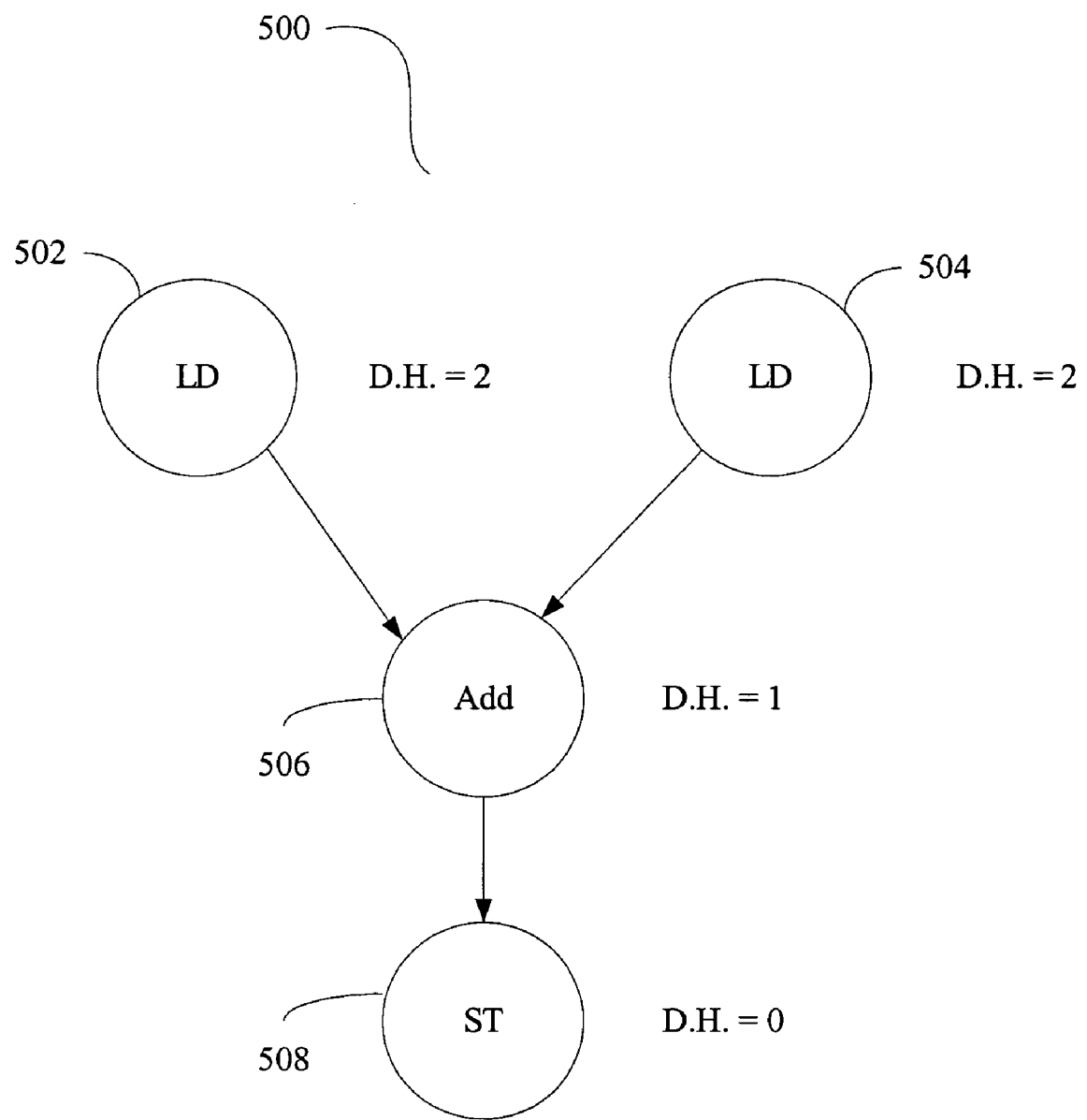
FIG. 5 is a block diagram illustrating a first sample directed acyclic graph that represents the dependences among the instructions of a first sample scheduling region.

A sample dependence graph that might have been generated at block 304 (FIG. 3) for the sample region is illustrated in FIG. 5. FIG. 5 illustrates a dependence graph 500 having four nodes, 502, 504, 506, 508. The dependence graph 500 illustrates that each of the load instructions corresponds to a node 502, 504 on which two other instructions depend. That is, the dependence height of the load nodes 502, 504 is two cycles (assuming that each instruction in the region requires only one machine cycle to complete execution). The dependence height value is evidenced by the total number of edges (two) between the top-most nodes 502, 504 and bottom-most node 508 of the graph 500.

The dependence graph 500 indicates that the node 506 corresponding to the add instruction has a dependence height of 1 cycle. That is, the add instruction needs to be executed one cycle before the last instruction in the dependence chain (the store). The dependence graph 500 further illustrates that the dependence height of the node 508 representing the store instruction is zero—no instructions are dependent on the store instruction.

Because the largest dependence height of a node on the dependence graph 500 is 2, we say that the total height of the dependence graph 500 is 2 cycles. Accordingly, DepLength (B) for the graph 500 illustrated in FIG. 5 is 2+1=3. That is, this DAG requires 3 cycles to execute, from the dependence point of view.

The ResLength(B) is the maximum number of cycles that any one resource requires to schedule the instructions of the scheduling region. The resource height is calculated for each resource type implied in the scheduling region, and the maximum of these values is selected as the ResLength(B). Thus, ResLength(B)=maximum number of cycles that any one resource needs to schedule all instructions in the scheduling region.

A target processor may include many types of resources that are available for execution of instructions: one or more arithmetic logic units ("ALU's"), one or more floating point execution units, one or more load ports, one or more store ports, etc. Each target processor is able to process a given number of each instruction type in each cycle. For example, assume that a particular target processor is capable of executing six ALU instructions per cycle. Also assume that the same target processor can process only two store instructions per cycle.

For purposes of further discussion, consider the following sequence of instructions in a scheduling region (written in pseudo-code) where thirty (30) add instructions feed thirty (30) store instructions:

| | |
|---|---|
| Add | R1 = R1 + R2 |
| ST | [A] = R1 |
| Add | R2 = R2 + R3 |
| ST | [B] = R2 |
| Add | R3 = R3 + R4 |
| ST | [C] = R3 |
| Add | R4 = R4 + R5 |
| ST | [D] = R4 |
| ... | |
| Add | R26 = R26 + R27 |
| ST | [Z] = R26 |
| Add | R27 = R27 + R28 |
| ST | [AA] = R27 |
| Add | R28 = R28 + R29 |
| ST | [BB] = R28 |
| Add | R29 = R29 + R30 |
| ST | [CC] = R29 |
| Add | R30 = R30 + R31 |
| ST | [DD] = R30 |

Figure 6:
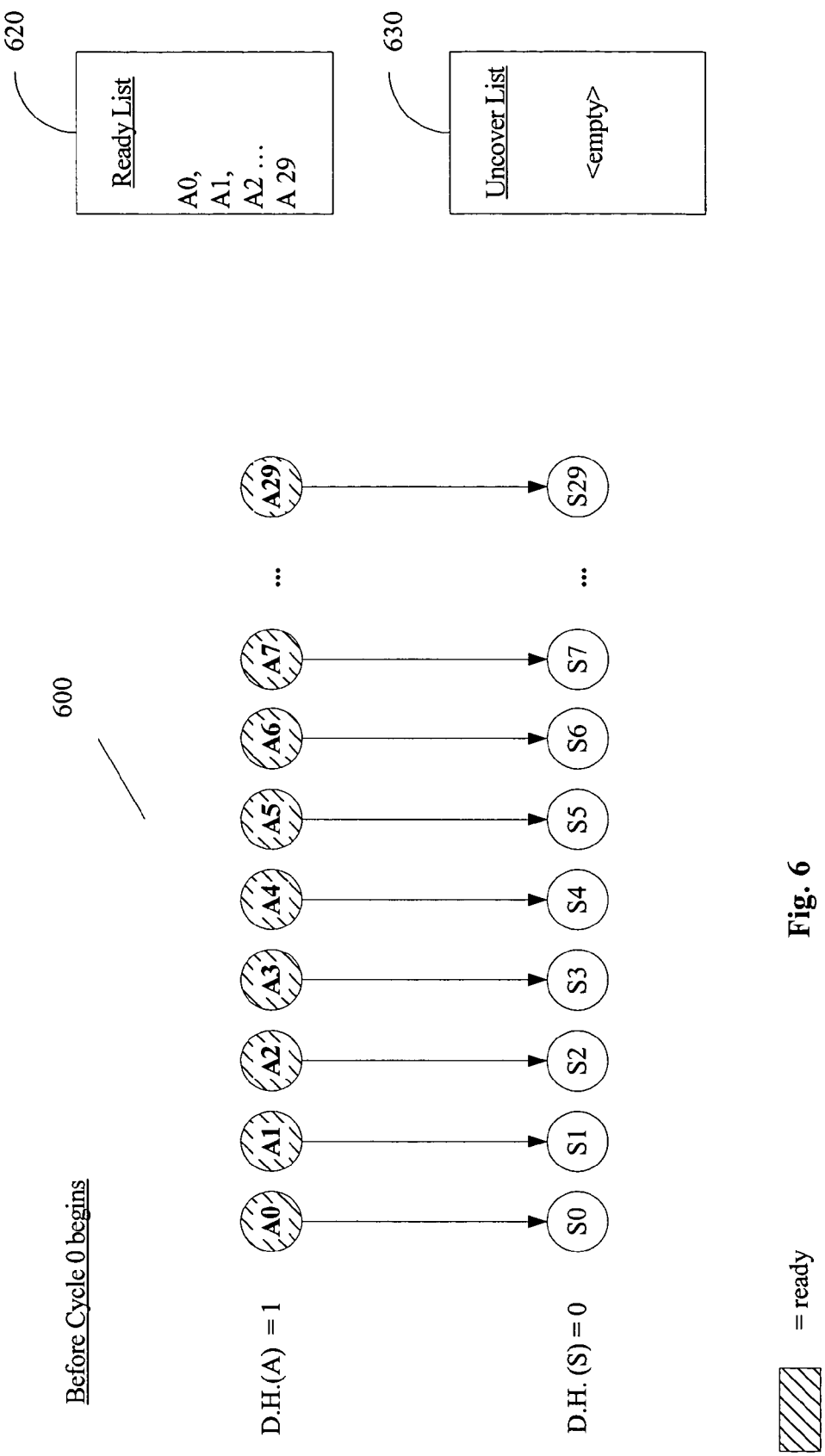
FIGS. 6-8 are block diagrams illustrating a second sample directed acyclic graph that represents the dependences among the instructions of a second sample scheduling region.

A sample dependence graph that might have been generated at block 304 (FIG. 3) for the sample region is illustrated in FIG. 6. FIG. 6 illustrates a dependence graph 600 having sixty (60) nodes, A0-A29, S0-S29. The dependence graph 600 illustrates that each of the add instruction corresponds to a node A0-A29 on which one store instruction node S0-S29, respectively, depends. That is, the dependence height of the add nodes A0-A29 is one cycle (assuming that each instruction in the region requires only one machine cycle to complete execution). The dependence height of the store nodes S0-S29 is zero. DepLength for the graph 600 illustrated in FIG. 6 is total height of the dependence graph 600 (1 cycle) plus 1:1+1=2. The dependence graph 600 is thus wide and shallow.

To determine the ResLength(B) for the dependence graph 600 illustrated in FIG. 6, the maximum number of cycles needed for each resource type implicated by the instructions in the scheduling region is first calculated. The graph includes thirty (30) add instruction nodes and thirty (30) store instruction nodes. For the target processor under consideration in our example, let us assume that both instruction types may be executed by an ALU. As is set forth above, we have assumed that the example target processor is capable of executing six ALU instructions per cycle and that the same target processor can process only two store instructions per cycle.

Accordingly, the number of cycles needed to schedule the sixty (60) ALU instructions represented in the dependence graph 600 is 60÷6=10 cycles. Thus, the particular machine resource (namely, the ALU units) can accommodate scheduling of all sixty ALU instructions of the scheduling region in a minimum of 10 machine cycles. Similarly, because the processor can only execute two store instructions per cycle, the number of cycles needed to schedule the thirty (30) store instructions represented in the dependence graph 600 is 30÷2=15 cycles. The ResLength(B) is the maximum of these values. For the example set forth above and illustrated in FIG. 6, the ResLength(B) is Max (10, 15)=15 cycles.

MinSchedLength(B) is the minimum number of cycles required to schedule the instructions of the scheduling region, taking both dependence height and resource height into account. MinSchedLength(B) is calculated as Max (DepLength(B), ResLength(B)). For the example set forth above and illustrated in FIG. 6, DepLength(B)=2 and ResLength (B)=15. Accordingly, the dependence graph 600 is resource-bound rather than being dependence-bound. MinSchedLength(B) for the region B illustrated in the graph 600 is Max (2, 15)=15 cycles.

FIG. 4 illustrates that, after DepLength(B), ResLength(B) and MinSchedLength(B) are calculated for the scheduling region B at block 404, processing proceeds to block 406.

At block 406, initial scheduling values are calculated for the instructions in the scheduling region. FIG. 4 illustrates that, at block 406, the following values are calculated for each instruction in the scheduling region: dependence height (DepHeight(I)), resource height (ResHeight(I)), dependence deadline (DepDeadline(I)), resource deadline (ResDeadline (I)), deadline (Deadline(I)), and slack (Slack(I)).

Dependence height for an instruction I (DepHeight(I)) indicates the total height of the subgraph that includes nodes for instructions that directly and indirectly depend on I. For example, the dependence graph 500 in FIG. 5 illustrates that dependence height for the load instruction nodes 502, 504 is two cycles—the subgraph for each of the load instructions 502, 504 has a height of two. While each subgraph includes an add instruction (see node 506) and a store instruction (see node 508), one of skill in the art will understand that a subgraph with a dependence height of two may include more than two instructions. The dependence height for the add instruction node 506 is one cycle and the dependence height for the store instruction node 506 is zero cycles.

Similarly, the dependence graph 600 illustrated in FIG. 6 shows that the dependence height for each add instruction (see nodes A0-A29) is one cycle, while the dependence height for each store instruction (see S0-S29) is zero cycles. As used herein, the terminology DepHeight(A) is used to generically reflect the dependence height for any of the add instructions (see nodes A0-A29) in the scheduling region B represented by the graph 600 illustrated in FIG. 6. Similarly, the terminology DepHeight(S) is used to generically reflect the dependence height for any of the store instructions (see nodes S0-S29) in the scheduling region B represented by the graph 600 illustrated in FIG. 6. For the example set forth above and illustrated in FIG. 6, DepHeight(A)=1 cycle and DepHeight(S)=0 cycles.

Returning to FIG. 4, one can see that the resource height for an instruction I (ResHeight(I)) is also calculated at block 406. The resource height for an instruction is the maximum value from the set of values that reflect resource availability for each instruction type to which instruction I belongs. That is, ResHeight(I)=Max (ResHeight(InstrClass$_0$(I) . . . ResHeight (InstrClass$_N$(I)). The resource height for an instruction class is initialized to the ceiling of (number of instructions from B in that class/number of instructions in that class that can execute in a cycle). If resource availability for each instruction type is reflected as a histogram bar, then the ResHeight(I) is initialized to the maximum height of the histogram bars representing the resources in this class.

For further discussion of the ResHeight(I) calculation, we turn again to the example illustrated by the graph 600 set forth in FIG. 6. The store instructions illustrated in nodes S0-S29 of the graph 600 fall into several different instruction classes. The instructions are ALU instructions. ALU instructions include memory instructions. Memory instructions include store instructions. Accordingly, the store instructions of the scheduling region fall into the following three instruction categories: ALU instruction, Memory instruction, and Store instruction. The ResHeight(S) for the store instructions is the max of its various class-specific resource heights.

The resource height for the store instructions, when considered as part of a class of store instructions which can only be processed two per cycle, is calculated as follows: ResHeight$_{Store}$ (S)=30 instructions/2 instructions/cycle=15 cycles. For a target processor that can execute four memory instructions per cycle, the resource height for the store instructions, when considered as part of the class of memory instructions, is calculated as follows: ceiling [ResHeight$_{Mem}$(S)=30 instructions/4 instructions/cycle=7.5 cycles]=8 cycles.

For a target processor that can execute 6 ALU instructions per cycle, the resource height for the store instructions, when considered as part of the class of ALU instructions, is thus calculated as follows. Because the add instructions (see nodes A0-A29) are also ALU instructions, the total number of instructions involved in this calculation is sixty instructions: ResHeight$_{ALU}$(S)=60 instructions/6 instructions/cycle=10 cycles. The ResHeight(S) is calculated as max (15, 8, 10)=15 cycles. Accordingly, the resource height for the store instructions in the scheduling region is 15 cycles.

By the same token, the resource height for the add instructions (ResHeight(A)) is also calculated at block 406. The add instructions are ALU instructions, which can be executed at a rate of 6 ALU instructions per cycle in our sample target processor. Because add instructions do not fall into another category of instruction types for our sample target processor, the ResHeight (A) for the add instructions is calculated simply as the ResHeight$_{ALU}$(A): 60 ALU instructions/6 instructions/cycle=10 cycles.

FIG. 4 illustrates that the dependence deadline (DepDeadline(I)) is also calculated at block 406 for each instruction I in the scheduling region. The dependence deadline for an instruction I is calculated as one less than the difference of the dependence height of the instruction (DepHeight(I)) and the minimum schedule length for the region (MinSchedLength (B)): DepDeadline(I)=MinSchedLength(B)−DepHeight(I)−1. Such value represents the minimum cycle by which the instruction should be scheduled. For example, consider the scheduling region represented by the graph 600 shown in FIG. 6. As is discussed above, MinSchedLength(B) for the scheduling region is 15 cycles. Also discussed above, the dependence height for an add instruction in the scheduling region (DepHeight(A)) is one cycle and the dependence height for a store instruction in the scheduling region (DepHeight(S)) is zero cycles. Accordingly, DepDeadline (A)= 15−1−1=13 cycles. Similarly, DepDeadline(S)=15−0−1=14 cycles. Thus, the first add instruction should be scheduled by the 13th cycle and the first store instruction must be scheduled by the 14th cycle. Note, however, that these scheduling deadline values take only dependence into account. As the discussion immediately below makes clear, taking resources limitations into account results in a very different deadline value.

FIG. 4 illustrates that resource availability is taken into account at block 406 when the resource deadline is calculated for each instruction I in the scheduling region. The resource deadline for an instruction I (ResDeadline(I)) is calculated as follows: ResDeadline(I)=MinSchedLength(B)−ResHeight (InstrClass(I)), where InstrClass is the instruction class having the highest resource height value for the instruction.

For the add instructions in the scheduling region represented by the graph 600 illustrated in FIG. 6, the resource deadline is calculated as follows. As is stated several times above, the MinSchedLength(B) for our sample scheduling region is 15 cycles. The resource height for the add instructions (ResHeight$_{ALU}$(A)) is 10 cycles. The resource height calculations for add instructions are simplified, as explained above, because add instructions are members of only one instruction class: ALU instructions. Accordingly, ResDeadline(A) for add instructions in scheduling region B is calculated as: 15−10=5. That is, taking resources into account, the first add instructions should be scheduled by cycle 5 (actually the sixth cycle, because the first cycle is assumed to start at cycle 0).

For the store instructions in the scheduling region represented by the graph 600 illustrated in FIG. 6, the resource deadline is calculated as follows. Again, MinSchedLength (B) for our sample scheduling region is 15 cycles. The resource height (ResHeight$_{Store}$(S)) is 15 cycles. Accordingly, ResDeadline(S) for store instructions in scheduling region B is calculated as: 15−15=0. That is, taking resources into account, store instructions should begin being scheduled in cycle 0. One of skill in the art will realize that the store instructions in our example cannot be scheduled in cycle 0 because they are consumers of values that are not ready at cycle 0. Nonetheless, the relative ResDeadline values for the sample store and add instructions indicate that it is important, if resources are taken into account, to schedule store instructions early, while it is not as important to schedule the add instructions early.

FIG. 4 further illustrates that, at block 406, a deadline value (Deadline(I)) is calculated for each instruction I in the scheduling region B. The deadline value reflects the latest cycle, given both dependence and resource considerations, that an instruction should be scheduled. The deadline for an instruction in the scheduling region is calculated as follows: Deadline(I)=min (DepDeadline(I), ResDeadline(I)). For the 30 add/30 store example set forth above and illustrated in FIG. 6, the deadline value for the add instructions and the store instructions, respectively, in the scheduling region is calculated at block 406 as follows:

Deadline(A)=min(13, 10)=10.

Deadline(S)=min(14, 0)=0.

Accordingly, the deadline values indicate that the store instructions should be scheduled as soon as possible, but that there is a slack of 10 cycles before add instructions need be scheduled. Of course, add instructions may be scheduled earlier than cycle 10, if other considerations warrant such an approach.

Finally, FIG. 4 further illustrates that a slack value is calculated, at block 406, for each instruction in the scheduling region. The slack value indicates the remaining number of cycles that may pass before it is critical to schedule the particular instruction. In other words, the slack value indicates scheduling priority. For example, if the deadline for a particular add instruction indicates that it need not be scheduled until the 6th cycle (cycle 5), then there are 5 cycles of slack remaining at cycle 0 before scheduling of the add instruction becomes critical. Thus, the slack value for an instruction is determined as follows: Slack(I)=Deadline(I)−current cycle.

After the instruction-specific initial scheduling values are computed at block 406, processing for the embodiment of initial values computation 306 illustrated in FIG. 4 ends at block 408.

Returning to FIG. 3, it illustrates that processing proceeds from initial value computation 306 to block 308. At block 308, as is explained above, a ready list is initialized to reflect the ready instructions in the DAG that was created at block 304. The entries of the ready list reflect those instructions of the scheduling region that are ready for scheduling during the current cycle.

FIG. 6 is consulted in conjunction with FIG. 3 for further discussion of the ready list initialization 308. FIG. 6 illustrates that 30 nodes (A0-A29) of the DAG 600 correspond to the 30 add instructions in the scheduling region. At cycle 0, all such instructions are ready to be scheduled. Accordingly, an entry for each of these nodes is added, during ready list initialization 308, to the ready list 620. These nodes are thus reflected as entries in the ready list 620.

FIG. 3 illustrates that the nodes in the ready list 620 are then sorted 312 in ascending order according to their slack values. (Note that slack values for each of the ready instructions, as well as all other instructions in the DAG 600, were calculated at block 306; also see block 406 of FIG. 4). Processing for the ready list preparation 204 then ends at block 314.

FIG. 2 illustrates that, after ready list preparation 204, logic for resource-aware scheduling is executed at block 206. We now turn to FIG. 9 for a further discussion of block 206.

Figure 9:
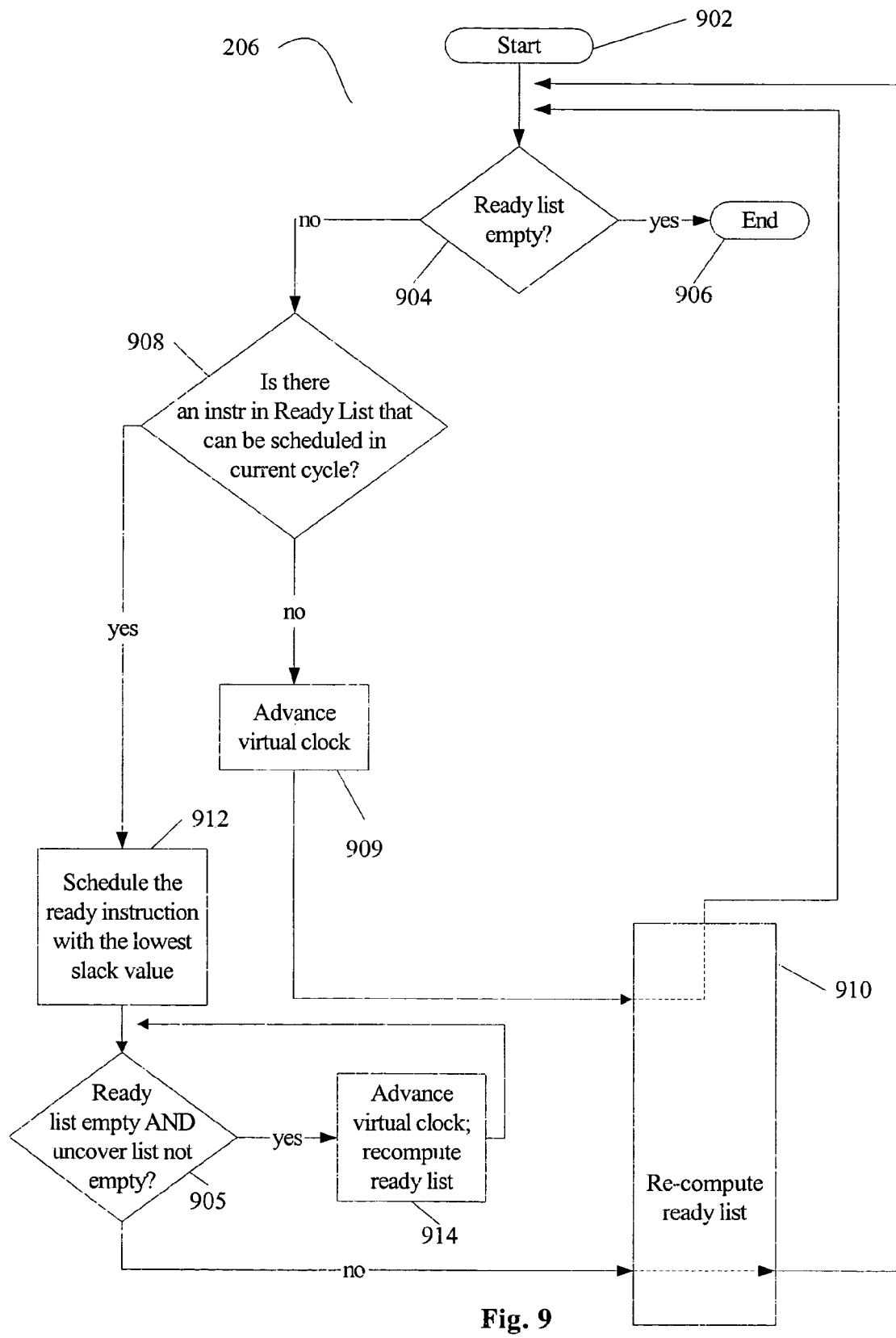
FIG. 9 is a flowchart illustrating in further detail at least one embodiment of scheduling logic that takes resources into account.

FIG. 9 is a flowchart illustrating further detail for at least one embodiment of a method for scheduling instructions while taking resources into account, as is set forth generally at block 206 of FIG. 2. FIG. 9 illustrates that processing for such scheduling begins at block 902 and proceeds to block 904.

At block 904, it is determined whether the ready list (see 620, FIG. 6) is empty. If, upon entry to the method 206, the ready list is empty, then all instructions in the scheduling region have been scheduled. If such is the case, processing ends at block 906. If, however, the ready list is determined at block 904 to be not empty, processing proceeds to block 908.

At block 908 it is determined whether there is an instruction in the ready list that can be scheduled in the current cycle. If so, then processing proceeds to block 912. If not, then processing proceeds to block 909.

When the path from block 908 to block 909 is followed, it is true that the ready list indicates ready instructions, but none of the ready instructions can be scheduled in the current cycle (due, for example, to resource constraints). As is discussed in greater detail immediately below, as long as the ready list is not empty, the virtual clock will continue to be advanced until one of the instructions in the ready list can be scheduled, as determined at block 908.

At block 909, the virtual clock is advanced to the subsequent machine cycle. Processing then proceeds to block 910, where the ready list is re-computed and re-sorted. At block 910, the ready list is updated to reflect any new instructions that have become ready in the subsequent cycle; the ready list is then re-sorted. Processing then loops back to block 904.

If, however, it is determined at block 908 that an instruction in the ready list may be scheduled during the current cycle, then processing proceeds to block 912, as is stated above. At block 912, an instruction is scheduled. If only one instruction in the ready list can be scheduled in the current cycle, that instruction is scheduled. If, however, more than one instruction from the ready list could be scheduled in the current cycle, one such instruction is selected. The instruction is selected by choosing that ready instruction having the lowest slack value. In other words, the instruction with the highest scheduling priority is selected and scheduled.

If two or more ready instructions have the same "lowest" slack value, one of those instructions is selected randomly at block 912. The scheduled instruction is removed from the ready list. In addition, at block 912 any instructions that are uncovered by the scheduling of the selected instruction are placed into the uncover list 630 (FIG. 6; see discussion immediately below). Processing then proceeds to block 905.

At block 905, it is determined whether the ready list 620 (FIG. 6) is empty AND the uncover list 630 (FIG. 6) is not empty. If not, processing proceeds to block 910. An uncover list reflects those nodes that have been "uncovered" during a current cycle due to scheduling of instructions on which the uncovered instructions depend.

If the uncover list 630 is not empty but the ready list 620 is empty, then there are uncovered instructions that will eventually be ready for scheduling, but that are not yet ready. In such case, processing proceeds to block 914, where the virtual clock is advanced to the next clock cycle. Also at block 914, any instructions from the uncover list that are now ready in the subsequent cycle are added to the ready list and removed from the uncover list. Processing then proceeds back to block 905. This loop (905, 914, 905) is repeated until at least one of the uncovered instructions is now ready. At such time, block 905 evaluates to "false" and processing thus proceeds to block 910 and then loops back to block 904.

Figure 10:
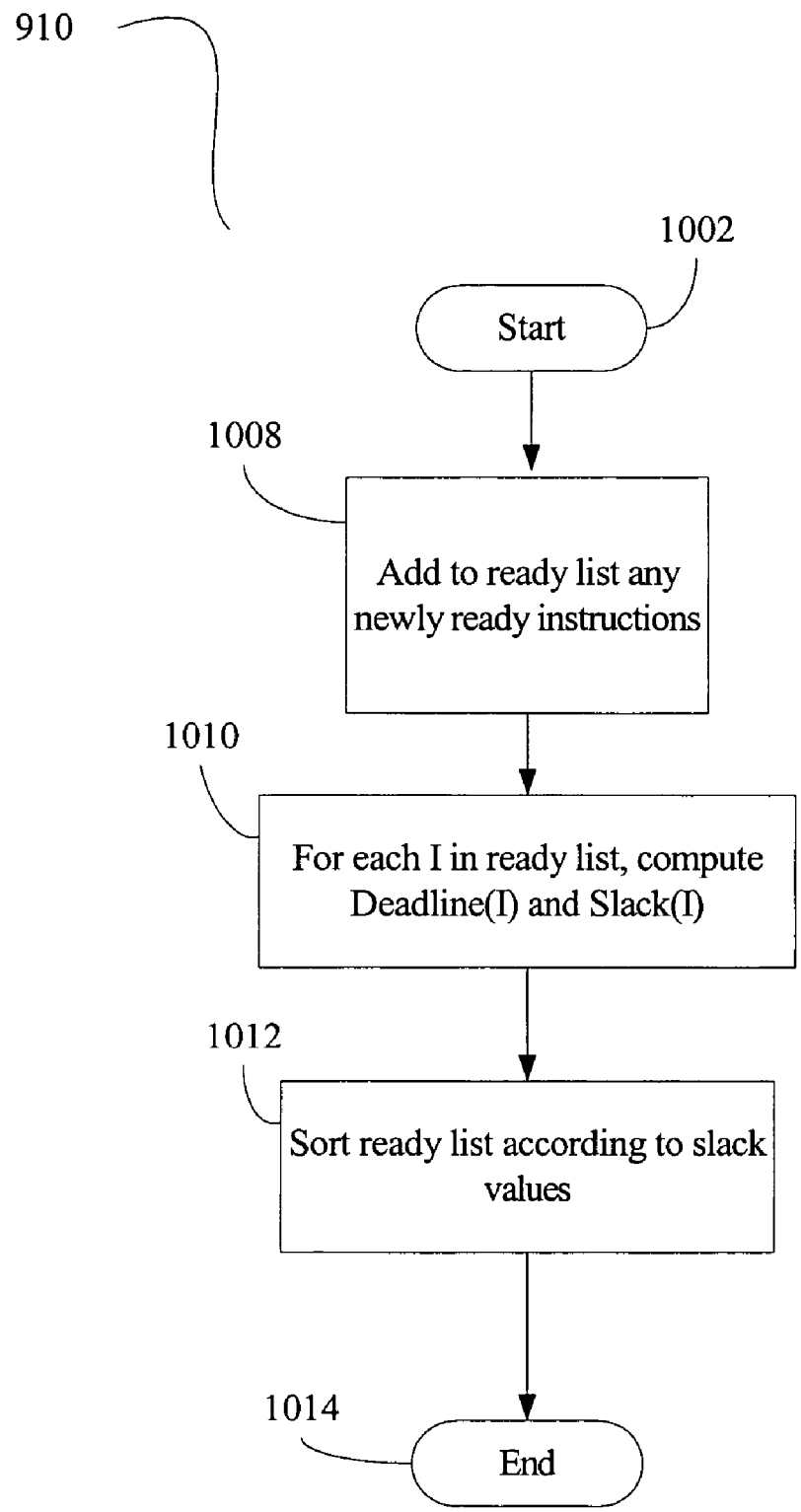
FIG. 10 is a flowchart illustrating in further detail at least one embodiment of a resource-aware method for updating a ready list after an instruction has been scheduled.

FIG. 9 illustrates that the ready list is updated at block 910, after an instruction is scheduled at block 912. FIG. 10 is a flowchart illustrating further detail for at least one embodiment of the ready list update logic 910.

FIG. 10, discussed here in conjunction with FIG. 6, illustrates that processing for at least one embodiment of ready list update logic 910 begins at block 1002 and proceeds to block 1008.

At block 1008, any instructions that have become ready during the current cycle are added to the ready list. Processing then proceeds to block 1010.

At block 1010, the deadline value and slack value for each instruction in the ready list is re-computed. The deadline value and slack value for each instruction is subject to change after other instructions have been scheduled. Accordingly, these values are re-calculated at block 1010. In contrast, DepLength(B), ResLength(B) and MinSchedLength(B) are not re-calculated at block 1010 because these values do not change as instructions are scheduled.

From block 1010, processing proceeds to block 1012. At block 1012, the ready list is sorted according to the newly-calculated slack values. Processing for the update ready list logic 910 then ends at block 1014.

FIGS. 2 and 6-9 are referenced together in the following discussion of the 30 add/30 store example set forth above and illustrated in FIG. 6. The example is discussed below in order to further illustrate the processing of at least one embodiment of the method 200 illustrated in FIG. 2. The example assumes that the machine model (see 22, FIG. 1) reflects a target processor with machine resources as follows. The target processor is assumed, for purposes of illustration, to have four memory ports: M0, M1, M2, and M3. It is further assumed that the target processor includes two integer ports (I0 and I1), two floating-point ports (F0 and F1), and three (3) branch ports (B0, B1, B2). It is assumed that add instructions and other general ALU instructions can be scheduled on any of the four memory ports (M0, M1, M2, M3) as well as on either of the two integer ports (I0, I1). Furthermore, it is assumed that store instructions, a sub-class of ALU instructions, can only be scheduled on ports M2 or M3. Accordingly, six ALU instructions may be scheduled per cycle, but only two of those instructions may be store instructions.

FIG. 6 illustrates that, at the beginning of cycle 0, the ready list 620 as prepared at block 204 reflects that all 30 add instructions are ready. Accordingly, the ready list includes entries for nodes A0-A29, sorted in order of slack. For this example, all entries of the ready list have the same slack value. At the beginning of cycle 0, the initial scheduling values for scheduling region B, as computed at block 204 of FIG. 2 (see also 306, FIG. 3 and 404, FIG. 4), are as follows:

DepLength(B)=1+1=2

MinSchedLength(B)=max(2, 15)=15.

ResLength(B)=15.

ResLength(B) is calculated as the max of the following instruction-specific resource length values: $ResLength_{Store}=15$; $ResLength_{Add}=8$. The instructions for each instruction-type may be allocated across the available resources as follows. These allocations may, for at least one embodiment, be represented as histograms: M2=15; M3=15; M0=8; M1=8, I0=7; I1=7. Note that such distribution reflects that the instructions of a particular instruction type are distributed as evenly as possible among available resources. Accordingly, the thirty (30) add instructions are divided as evenly as possible among the M0, M1, I0 and I1 ports.

At the beginning of cycle 0, the initial scheduling values for the ready instructions in scheduling region B, as computed at block 204 of FIG. 2 (see also, for at least one embodiment, block 306 of FIG. 3 and block 406 of FIG. 4), are as follows. Note that instruction-specific values for only add instructions are indicated, since none of the store instructions are ready at the beginning of cycle 0:

More specifically, the scheduling processing 206 occurs as follows.

FIG. 9 is consulted in conjunction with FIGS. 2 and 6 in order to further discuss the scheduling logic 206 of cycle 0 for our example. Because all add instructions have the same slack value, it will be assumed that the instructions are scheduled in the order that they appear in region B. Accordingly, on a first pass through method 200 during cycle 0, the ready list is determined at block 904 to be not empty. Processing proceeds to block 908.

At block 908, it is determined that the ready list 620 includes ready instructions that can be scheduled in the current cycle—thirty Add instructions are ready and six Add instructions may be scheduled per cycle; none have been scheduled yet. Accordingly, processing proceeds to block 912, where A0 is scheduled. The ready list is not empty, so processing falls through block 905 and proceeds to block 910, where the ready list is updated to remove the A0 entry. Processing loops back to block 904, where it is determined that the ready list 620 is not empty, since it still contains twenty-nine ready add instructions. Processing thus proceeds for a second pass through block 908 for cycle 0.

At the second pass through block 908 it is again determined that an instruction from the ready list may be scheduled (only 1 of 6 ALU instructions has been scheduled for cycle 0). Processing proceeds to block 912, where the next ALU instruction, A1, is scheduled for cycle 0. Processing falls through block 905 and proceeds to block 910, where the ready list is updated to remove the entry for A1. Processing then proceeds to block 904, where it is determined that the ready list is not empty (it still contains 28 add entries). The processing continues in this fashion in order to schedule instructions A2, A3, A4 and A5 for cycle 0.

On the seventh pass through block 206 for cycle 0, it is determined at block 908 that the ready list is not empty, but that that none of the ready instructions can be scheduled. That is, all instructions in the ready list are ALU instructions, but all available ALU resources have already been scheduled for cycle 0. Accordingly, the virtual clock is advanced at block 909 and the ready list is re-computed at block 910. Processing then proceeds back to block 904.

As the six add instructions are scheduled in cycle 0, they may be assigned to resources according to an algorithm that attempts to keep resource usage relatively balanced. For this reason, the six add instructions scheduled at the first six

---

DepHeight(A) = 1
ResHeight(A) = 8              // Max of M0, M1, I0 and I1 values
DepDeadline(A) = 15 − 1 − 1 = 13
ResDeadline(A) = 15 − 8 = 7
Deadline(A) = min (13, 7) = 7     // Add instructions should be scheduled by cycle 7
Slack (A) = Deadline (A) − current_cycle = 7 − 0 = 7

---

Accordingly, at the beginning of cycle 0, all 30 add instructions have a slack of 7 cycles. This slack value is merely an estimation, of course, and does not take into account that other instructions in the scheduling region may depend on these instructions. Since, in reality, the store instructions depend on the add instructions, it is not practical to avoid scheduling all the add instructions until the eight cycle. Thus, although there is ample slack for the add instructions, there is no harm in scheduling the add instructions earlier. Accordingly, since the ready list 620 includes only add instructions, six add instructions are scheduled for cycle 0 at block 206.

passes of schedule processing 206 for cycle 0 may be scheduled such that two such instructions are scheduled for the I0 port and the I1 ports, while one instruction is scheduled for each of the M0 and M1 ports.

Figure 7:
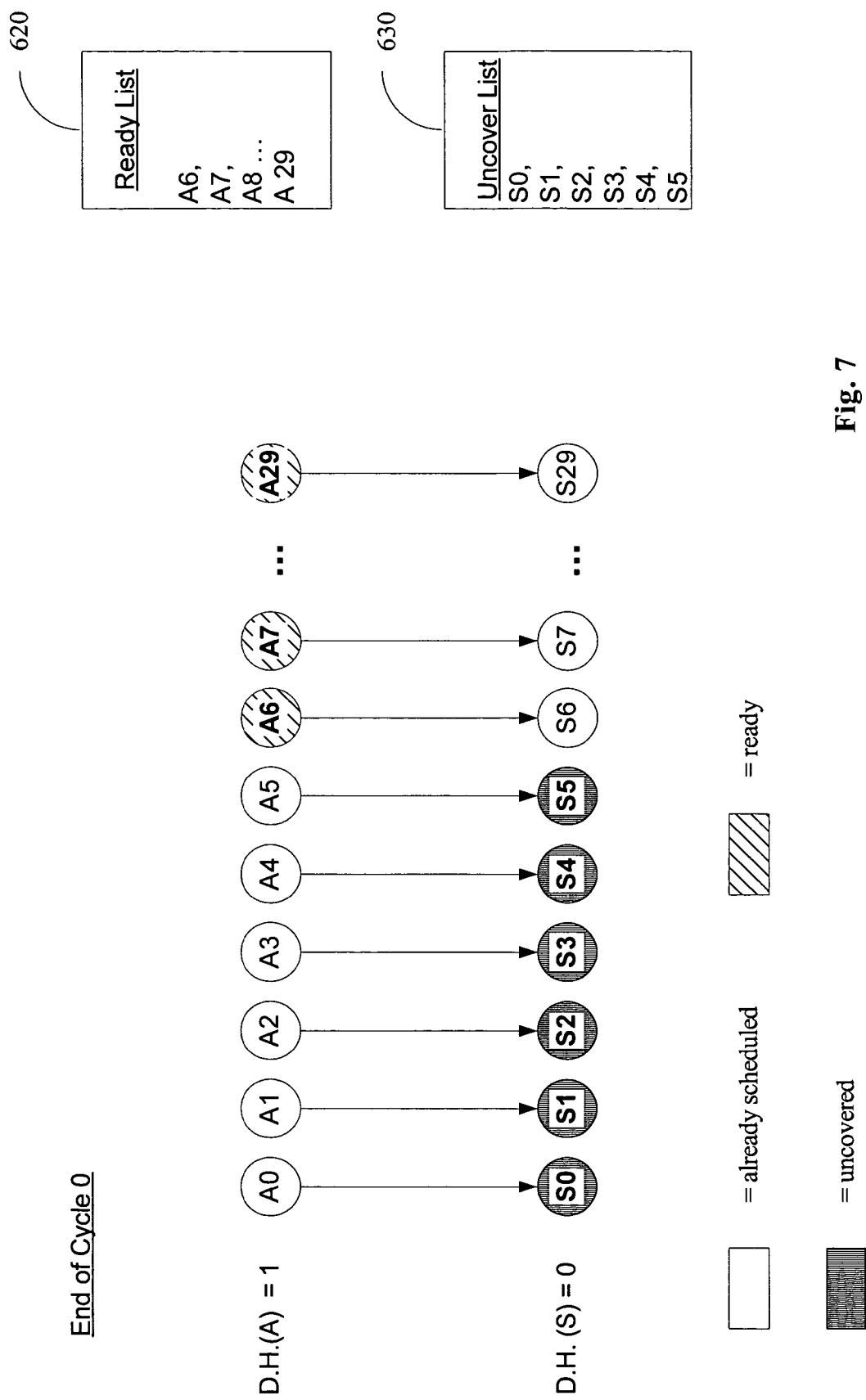

FIG. 7 illustrates that, at the end of cycle 0 processing, six add instructions, A0-A5, have been scheduled. Scheduling of such instructions has uncovered the six (6) store instructions S0-S5 that depend, respectively, on the scheduled add instructions. Accordingly, the uncover list includes the six uncovered instructions. The ready list includes the remaining twenty-four (24) unscheduled, but ready, add instructions.

Figure 8:
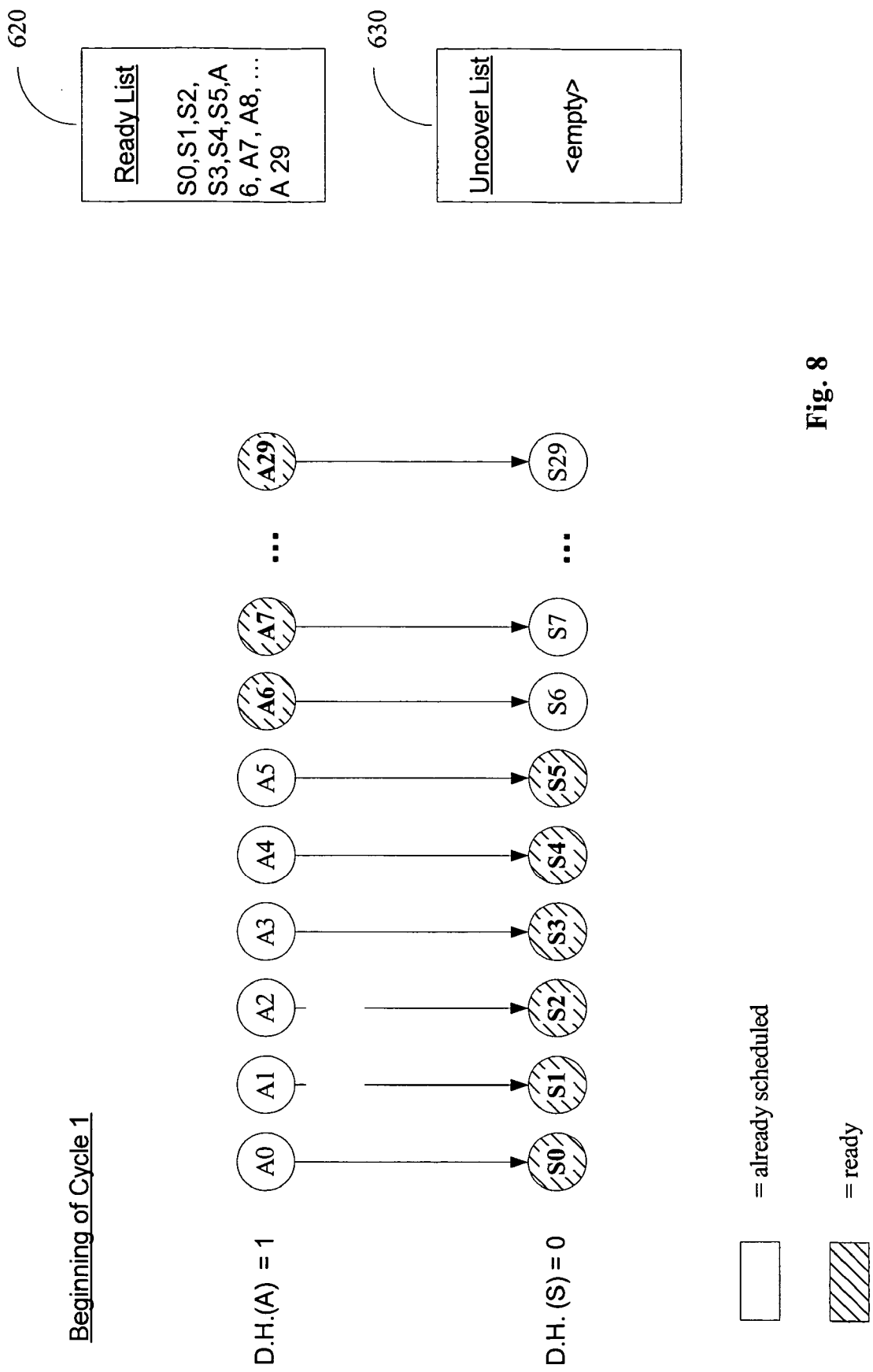

FIG. 8 illustrates that, at the beginning of cycle 1, the ready list 620 reflects 24 add instructions and 6 store instructions. No instructions have yet been scheduled for this cycle, therefore no instructions have been uncovered for this cycle. Accordingly, at the beginning of cycle 1, the uncover list 630 is empty.

At the beginning of cycle 1, the scheduling values for the ready instructions in scheduling region B, as computed at block 910 of FIG. 9, are as follows. Note that instruction-specific values for both add instructions and store are indicated, since both types of instructions now appear in the ready list 620:

```
// "A" refers to add instructions

DepHeight(A) = 1

ResHeight(A) = 6              // Max of M0, M1, I0 and I1 values

DepDeadline(A) = 15 − 1 − 1 = 13

ResDeadline(A) = 15 − 6 = 9

Deadline(A) = min (13, 9) = 9    // Add instructions should be scheduled by cycle 9
Slack (A) = Deadline (A) − current_cycle = 9 − 1 = 8
// "S" refers to add instructions
DepHeight(S) = 0
ResHeight(S) = 15             // Max of M2 and M3 values
DepDeadline(S) = 15 − 0 − 1 = 14
ResDeadline(S) = 15 − 15 = 0
Deadline(S) = min (14, 0) = 0   // Store instructions should be scheduled by cycle 0
Slack (S) = Deadline (S) − current_cycle = 0 − 1 = −1
```

At the beginning of cycle 1, the ready list 620 has been sorted according to slack values such that the store instructions have higher scheduling priority than the add instructions. (Such sorting occurred during cycle 0 processing—see block 910 of FIG. 9). Add instructions, having a slack value of cycle 8, have a lower scheduling priority than store instructions, which have a slack value of −1.

For at least one embodiment, the resource-aware scheduling logic 206 performed for cycle 1 follows the flowchart set forth in FIG. 9. On the first pass of such processing 206 for cycle 1, it is determined at block 904 that the ready list is not empty, since it includes 24 add instructions and 6 store instructions. Accordingly, processing proceeds to block 908.

At block 908, it is determined that the ready list 620 does include an instruction that can be scheduled in the current cycle. The first store instruction is thus scheduled 912 and is removed from the ready list 620. The store instruction may be scheduled, for instance, for memory port M3. Processing then falls through block 905 and proceeds to block 910. The ready list 620 is re-computed, and processing proceeds back to block 904 for a second pass of resource-aware scheduling for cycle 1.

At this next pass of block 904 for cycle 1, it is determined that another store instruction is ready and may be scheduled. The second store instruction is thus scheduled 912 and is removed from the ready list. The instruction may be scheduled, for example, on memory port M4. Processing then proceeds back to block 904 after falling through block 905 and re-computing the ready list at block 910.

At block 904 it is determined that the ready list is not empty, and process proceeds back to block 908 for a third pass of resource-aware scheduling for cycle 1.

At this next pass of block 908 for cycle 1, it is determined that another store instruction is ready but that it may not be scheduled. Both resources capable of executing store instructions, M3 and M4, have been scheduled with store instructions; no further store instructions may be scheduled for the current cycle. Accordingly, it is then determined at block 908 that the ready list includes an add instruction that may be scheduled during the current cycle, since four more ALU ports are still available for scheduling during the current cycle. The next add instruction is thus scheduled 912 and is removed from the ready list 620. Processing then falls through block 905 and proceeds to block 910, where the ready list is re-computed. Processing then loops back to block 904 for a fourth pass of resource-aware scheduling for cycle 1.

At the fourth, fifth and sixth passes through block 206 for cycle 1, a second, third and fourth add instruction are scheduled for the remaining ALU ports available for cycle 1, and such add instructions are removed from the ready list 620.

At a seventh pass through block 206 for cycle 1, it is determined at block 908 that no further instructions from the ready list may be scheduled for cycle 1, since six (6) ALU instructions have already been scheduled for cycle 1. Processing thus proceeds to block 909. At block 909, the virtual clock is advanced; processing then proceeds to block 910 to re-compute the ready list 620.

Processing then proceeds to block 904 in order to begin a first pass through resource-aware scheduling logic 206 for cycle 2. At the beginning of cycle 2, there are twenty (20) ready add instructions and eight (8) store instruction entries in the ready list 620.

At the beginning of cycle 2, the scheduling values for the ready instructions in scheduling region B, as computed at block 910 of FIG. 9, are as follows:

// "A" refers to add instructions

DepHeight(A) = 1

ResHeight(A) = 5          // Max of M0, M1, I0 and I1 values

DepDeadline(A) = 15 − 1 − 1 = 13

ResDeadline(A) = 15 − 5 = 10

Deadline(A) = min (13, 10) = 10      // Add instructions should be scheduled by cycle 10

Slack (A) = Deadline (A) − current_cycle = 10 − 2 = 8

// "S" refers to add instructions

DepHeight(S) = 0

ResHeight(S) = 14          // Max of M2 and M3 values

DepDeadline(S) = 15 − 0 − 1 = 14

ResDeadline(S) = 15 − 14 = 1

Deadline(S) = min (14, 1) = 1      // Store instructions should be scheduled by cycle 1

Slack (S) = Deadline (S) − current_cycle = 1 − 2 = −1

At the beginning of cycle 2, the ready list 620 has again been sorted according to slack values such that the store instructions have higher scheduling priority than the add instructions. (Such sorting occurred during cycle 1 processing—see block 910 of FIG. 9). Add instructions, having a slack value of cycle 8, have a lower scheduling priority than store instructions, which have a slack value of −1.

Again, the store instructions do not have any slack, while add instructions have higher slack values. Accordingly, during the first two passes through the resource-aware logic 206 for cycle 2, two of the eight ready store instructions are scheduled. For at least one embodiment, they may be scheduled for ports M3 and M4. During the next four passes of the resource-aware scheduling logic 206 for cycle 2, four add instructions are scheduled. For at least one embodiment, such add instructions are scheduled for ports I0, I1, M0 and M1. The virtual clock is then advanced 909 to the subsequent cycle (cycle 3).

At the beginning of cycle 3, there are sixteen (16) add instruction entries and ten (10) store instruction entries in the ready list 620. The scheduling values for the ready instructions in scheduling region B, as computed at block 910 of FIG. 9, are as follows:

// "A" refers to add instructions

DepHeight(A) = 1

ResHeight(A) = 4          // Max of M0, M1, I0 and I1 values

DepDeadline(A) = 15 − 1 − 1 = 13

ResDeadline(A) = 15 − 4 = 11

Deadline(A) = min(13, 11) = 11      // Add instructions should be scheduled by cycle 11

Slack (A) = Deadline (A) − current_cycle = 11 − 3 = 8

// "S" refers to add instructions

DepHeight(S) = 0

ResHeight(S) = 13          // Max of M2 and M3 values

DepDeadline(S) = 15 − 0 − 1 = 14

ResDeadline(S) = 15 − 13 = 2

Deadline(S) = min(14, 2) = 2      // Store instructions should be scheduled by cycle 2

Slack (S) = Deadline (S) − current_cycle = 2 − 3 = −1

At the beginning of cycle 3, the ready list 620 has again been sorted according to slack values such that the store instructions have higher scheduling priority than the add instructions. (Such sorting occurred during cycle 2 processing—see block 910 of FIG. 9). Add instructions, having a slack value of cycle 8, have a lower scheduling priority than store instructions, which have a slack value of −1.

Again, the store instructions do not have any positive slack, while add instructions have higher slack values. Accordingly, during the first two passes through resource-aware scheduling logic 206 for cycle 3, two of the ten ready store instructions are scheduled. For at least one embodiment, they may be scheduled for ports M3 and M4. During the next four passes of the resource-aware scheduling logic 206 for cycle 3, four add instructions are scheduled. For at least one embodiment, such add instructions are scheduled for ports I0, I1, M0 and M1.

Processing for cycles 4 and 5 proceed in a manner similar to that explained above for cycles 2 and 3. For each of cycles 4 and 5, two store instructions are scheduled and four add instructions are scheduled. For at least one embodiment, the instructions are scheduled in a manner that balances the resource utilization. That is, for cycles 4 and 5, the two store instructions are scheduled for ports M3 and M4, respectively, while the four add instructions are scheduled for ports I0, I1, M0 and M1, respectively.

At the beginning of cycle 6, there are four (4) add instructions and sixteen (16) store instructions in the ready list 620. The scheduling values for the ready instructions in scheduling region B, as computed at block 910 of FIG. 9, are as follows:

```
// "A" refers to add instructions
DepHeight(A) = 1
ResHeight(A) = 1              // Max of M0, M1, I0 and I1 values
DepDeadline(A) = 15 − 1 − 1 = 13
ResDeadline(A) = 15 − 1 = 14
Deadline(A) = min (13, 14) = 13   // Add instructions should be scheduled by cycle 13
Slack (A) = Deadline (A) − current_cycle = 13 − 6 = 7
// "S" refers to add instructions
DepHeight(S) = 0
ResHeight(S) = 10             // Max of M2 and M3 values
DepDeadline(S) = 15 − 0 − 1 = 14
ResDeadline(S) = 15 − 10 = 5
Deadline(S) = min (14, 5) = 5    // Store instructions should be scheduled by cycle 5
Slack (S) = Deadline (S) − current_cycle = 5 − 6 = −1
```

At the beginning of cycle 6, the ready list 620 has again been sorted according to slack values such that the store instructions have higher scheduling priority than the add instructions. (Such sorting occurred during cycle 2 processing—see block 910 of FIG. 9). Add instructions, having a slack value of cycle 7, have a lower scheduling priority than store instructions, which have a slack value of −1.

During the first two passes of scheduling logic 206 for cycle 6, two store instructions are scheduled. During the remaining passes of the scheduling logic 206 for cycle 6, four add instructions may be scheduled. For at least one embodiment, the instructions are scheduled in a manner that balances the resource utilization. That is, the two store instructions may be scheduled for ports M3 and M4, respectively, while the four add instructions may be scheduled for ports I0, I1, M0 and M1, respectively.

At the beginning of cycle 7, there are eighteen (18) store instruction entries in the ready list 620. Because all 30 of the add instructions have been scheduled in the previous cycles (6 in cycle 0 and 4 each in cycles 1 through 6), there are no add instructions in the ready list. The scheduling values for the ready instructions in scheduling region B, as computed at block 910 of FIG. 9, are as follows. Note that instruction-specific values for only store instructions are indicated, since only store instruction entries now appear in the ready list 620:

```
// "S" refers to add instructions
DepHeight(S) = 0
ResHeight(S) = 9              // Max of M2 and M3 values
DepDeadline(S) = 15 − 0 − 1 = 14
ResDeadline(S) = 15 − 9 = 6
Deadline(S) = min (14, 6) = 6    // Store instructions should be scheduled by cycle 6
Slack (S) = Deadline (S) − current_cycle = 6 − 7 = −1
```

At the beginning of cycle 7, the ready list 620 has again been sorted according to slack values (such sorting occurred during cycle 6 processing—see block 910 of FIG. 9). However, the 18 remaining instructions in the ready list are all store instructions having the same slack value.

During the resource-aware scheduling logic 206 for cycle 7, two of the eight ready store instructions are scheduled. For at least one embodiment, they may be scheduled for ports M3 and M4. However, during the third iteration, and following iterations, of block 908 for cycle 7, it is determined that no additional ready instructions may be scheduled for cycle 7 once two store instructions have been scheduled. Thus, only two instructions may be scheduled during cycle 7.

Similarly, for cycles 8 through 15, only two store instructions are scheduled for each cycle during resource-aware scheduling logic 206.

Accordingly, the discussion above discloses embodiments of methods for resource-aware scheduling of instructions. The methods take into account resource constraints when determining scheduling priority for instructions within a scheduling region.

Embodiments of the methods 200 (FIG. 2), 204 (FIG. 3), 309 (FIG. 4), 206 (FIG. 9), and 910 (FIG. 10) disclosed herein may be implemented in hardware, software, firmware, or a combination of such implementation approaches. Software embodiments of the methods may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this disclosure, a processing system includes any system that has a processor, such as, for example; a network processor, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the methods described herein are not limited in scope to any particular programming language. In any case, the language may be a compiled or interpreted language The programs may be stored on a storage media or device (e.g., hard disk drive, floppy disk drive, read only memory (ROM), CD-ROM device, flash memory device, digital versatile disk (DVD), or other storage device) accessible by a general or special purpose programmable processing system. The instructions, accessible to a processor in a processing system, provide for configuring and operating the processing system when the storage media or device is read by the processing system to perform the actions described herein. Embodiments of the invention may also be considered to be implemented as a machine-readable storage medium, configured for use with a processing system, where the storage medium so configured causes the processing system to operate in a specific and predefined manner to perform the functions described herein.

Figure 11:
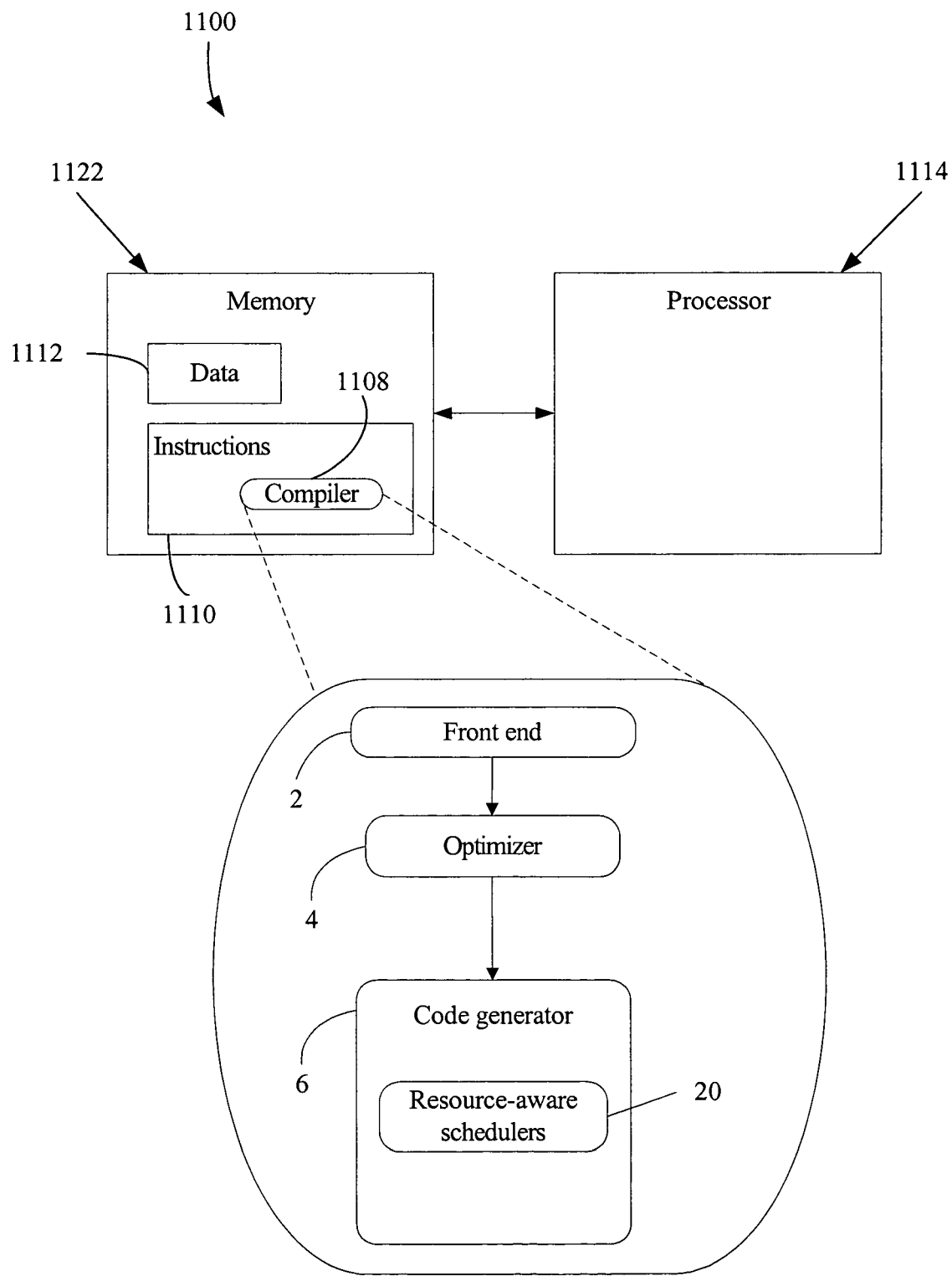
FIG. 11 is a block diagram illustrating a system to perform embodiments of resource-aware scheduling as disclosed herein.

An example of one such type of processing system is shown in FIG. 11. System 1100 may be used, for example, to execute the processing for a method of resource-aware instruction scheduling, such as the embodiments described herein. System 1100 is representative of processing systems based on the Itanium® and Itanium® 2 microprocessors and the Pentium®, Pentium® Pro, Pentium® II, Pentium® III, Pentium® 4 microprocessors, all of which are available from Intel Corporation. Other systems (including personal computers (PCs) and servers having other microprocessors, engineering workstations, personal digital assistants and other hand-held devices, set-top boxes and the like) may also be used. At least one embodiment of system 1100 may execute a version of the Windows™ operating system available from Microsoft Corporation, although other operating systems and graphical user interfaces, for example, may also be used.

Processing system 1100 includes a memory 1122 and a processor 1114. Memory system 1122 may store instructions 1110 and data 1112 for controlling the operation of the processor 1114. Memory system 1122 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 1122 may store instructions 1110 and/or data 1112 represented by data signals that may be executed by the processor 1114. For an embodiment wherein method 200, 206, and/or 910 is performed by a compiler, instructions 1110 may include a compiler program 1108.

FIG. 11 illustrates that the instructions implementing an embodiment of the methods 200, 206, 910 discussed herein may be logically grouped into various functional modules. For a compiler 1108 that includes functional groupings of instructions known as front end 2, optimizer 4, and back end code generator 6, embodiments of the methods 200, 206, 910 may be performed by the code generator 6. More specifically, at least one embodiment of methods 200, 206, 910 may be performed by one or more resource-aware schedulers 20.

In the preceding description, various aspects of a method, apparatus and system for resource-aware scheduling of instructions are disclosed. For purposes of explanation, specific numbers, examples, systems and configurations were set forth in order to provide a more thorough understanding. However, it is apparent to one skilled in the art that the described embodiments of a compiler, system and method may be practiced without the specific details. It will be obvious to those skilled in the art that changes and modifications can be made without departing from the present invention in its broader aspects.

For example, the scheduling method 200 (FIG. 2), resource-aware scheduling logic 206 (FIG. 9) and ready list update logic 910 (FIG. 10) have been illustrated as having a particular control flow. One of skill in the art will recognize that alternative processing order may be employed to achieve the functionality described herein. Similarly, certain operations are shown and described as a single functional block. Such operations may, in practice, be performed as a series of sub-operations.

While particular embodiments of the present invention have been shown and described, the appended claims are to encompass within their scope all such changes and modifications that fall within the true scope of the present invention.

What is claimed is:

1. A computer-implemented method of scheduling a plurality of instructions generated by a compiler based on an intermediate representation of source code, the method comprising:

for each of one or more of the plurality of instructions of one or more instruction types ready to be scheduled in a given cycle in a scheduling region, determining a new slack value based on a current maximum number of the instructions that can be scheduled in the given cycle for a target processor, wherein determining the new slack value comprises:

determining a minimum number of cycles needed to schedule each instruction in the scheduling region, taking resource height for each instruction into account, wherein the resource height is determined based on each resource availability for each instruction type to which each instruction belongs;

determining a dependence deadline based on a dependence height for each instruction and the minimum number of cycles, wherein the dependence height is determined based on a total height of a subgraph of a dependence graph of the scheduling region, and wherein the subgraph comprises one or more nodes to represent directly and indirectly dependent instructions of each instruction; and determining a resource deadline based on the resource height and the minimum number of cycles;

selecting up to the current maximum number of instructions from those instructions ready to be scheduled in the given cycle, based on a priority order associated with the new slack value; and scheduling the selected instructions.

2. The method of claim 1, wherein determining the new slack value comprises:

selecting as a deadline value that indicates a least number of cycles, between the resource deadline and the dependence deadline; and determining the new slack value based on the selected deadline value.

3. The method of claim 1, wherein the priority order comprises an ordering of the one or more instructions based on their new slack value, wherein the instructions with lowest slack value have highest priority.

4. The method of claim 1, further comprising:

generating an entry in a ready list for each of the one or more instructions prior to determining the new slack value; and removing the entry for the selected instructions from the ready list responsive to scheduling the selected instructions.

5. The method of claim 4, further comprising:

adding to an uncover list, any of the plurality of instructions not ready to be scheduled in the given cycle in the scheduling region that are uncovered by the scheduling of the selected instructions, wherein the instructions not ready to be scheduled are dependent on the selected instructions.

6. The method of claim 4, wherein the given cycle is a given clock cycle, further comprising:

advancing a virtual clock to a subsequent clock cycle when there are no instructions in the ready list that can be scheduled in the given clock cycle; and adding an entry to the ready list for any of the plurality of instructions not ready to be scheduled in the given cycle in the scheduling region that becomes ready in the subsequent clock cycle.

7. The method of claim 1, wherein determining the minimum number of cycles comprises:

determining a dependence length of the scheduling region;

determining a resource length of the scheduling region;

assigning the dependence length as the minimum number of cycles when the dependence length is greater than the resource length; and assigning the resource length as the minimum number of cycles when the resource length is greater than the dependence length.

8. The method of claim 7, further comprising:

calculating the dependence length of the scheduling region based on a total height of the dependence graph of the scheduling region; and calculating the resource length of the scheduling region based on the maximum number of cycles needed to schedule the one or more instructions in the scheduling region for the target processor.

9. An article comprising:

a computer readable medium having a plurality of machine accessible instructions stored thereon, which when executed by a computer, cause the computer to perform the following method:

for each of one or more instructions of one or more instruction types ready to be scheduled in a given cycle in a scheduling region, determining a new slack value based on a current maximum number of the instructions that can be scheduled in the given cycle for a target processor, wherein determining the new slack value comprises:

determining a minimum number of cycles needed to schedule each instruction in the scheduling region, taking resource height for each instruction into account, wherein the resource height is determined based on each resource availability for each instruction type to which each instruction belongs;

determining a dependence deadline based on a dependence height for each instruction and the minimum number of cycles, wherein the dependence height is determined based on a total height of a subgraph of a dependence graph of the scheduling region, and wherein the subgraph comprises one or more nodes to represent directly and indirectly dependent instructions of each instruction; and determining a resource deadline based on the resource height and the minimum number of cycles;

selecting up to the current maximum number of instructions from those instructions ready to be scheduled in the given cycle, based on a priority order associated with the new slack value; and scheduling the selected instructions.

10. The medium of claim 9, wherein determining the new slack value comprises:

selecting as a deadline value that indicates a least number of cycles, between the resource deadline and the dependence deadline; and determining the new slack value based on the selected deadline value.

11. The medium of claim 9, wherein the priority order comprises an ordering of the one or more instructions based on their new slack value, wherein the instructions with lowest slack value have highest scheduling priority.

12. The medium of claim 9, further comprising:

generating an entry in a ready list for each of the one or more instructions prior to determining the new slack value; and removing the entry for the selected instructions from the ready list responsive to scheduling the selected instructions.

13. The medium of claim 12, further comprising:

adding to an uncover list, any instructions not ready to be scheduled in the given cycle in the scheduling region that are uncovered by the scheduling of the selected instructions, wherein the instructions not ready to be scheduled are dependent on the selected instructions.

14. The medium of claim 12, wherein the given cycle is a given clock cycle, further comprising:

advancing a virtual clock to a subsequent clock cycle when there are no instructions in the ready list that can be scheduled in the given clock cycle; and adding an entry to the ready list for any instruction not ready to be scheduled in the given cycle in the scheduling region that becomes ready in the subsequent clock cycle.

15. The medium of claim 9, wherein determining the minimum number of cycles further comprises:

determining a dependence length of the scheduling region;

determining a resource length of the scheduling region;

assigning the dependence length as the minimum number of cycles when the dependence length is greater than the resource length; and assigning the resource length as the minimum number of cycles when the resource length is greater than the dependence length.

16. The medium of claim 15, further comprising:
calculating the dependence length of the scheduling region based on a total height of the dependence graph of the scheduling region; and
calculating the resource length of the scheduling region based on the maximum number of cycles needed to schedule the one or more instructions in the scheduling region for the target processor.

17. An apparatus for compiling a high-level programming language into an object code comprising:
a front end, implemented within a computer of said apparatus, to receive a source code; and
a code generator, coupled to the front end, to:
receive the source code from the front end; and
compile the received source code into the object code,
wherein the code generator includes one or more resource-aware schedulers to:
for each of one or more instructions of one or more instruction types ready to be scheduled in a given cycle in a scheduling region, determine a new slack value based on a current maximum number of the instructions that can be scheduled in the given cycle for a target processor, wherein determining the new slack value is to:
determine a minimum number of cycles needed to schedule each instruction in the scheduling region, taking resource height for each instruction into account, wherein the resource height is determined based on each resource availability for each instruction type to which each instruction belongs;
determine a dependence deadline based on a dependence height for each instruction and the minimum number of cycles, wherein the dependence height is determined based on a total height of a subgraph of a dependence graph of the scheduling region, and wherein the subgraph comprises one or more nodes to represent directly and indirectly dependent instructions of each instruction; and
determine a resource deadline based on the resource height and the minimum number of cycles;
select up to the current maximum number of instructions from those instructions ready to be scheduled in the given cycle, based on a priority order associated with the new slack value; and
schedule the selected instructions.

18. The apparatus of claim 17, wherein the one or more resource-aware schedulers are further to:
select as a deadline value that indicates a least number of cycles, between the resource deadline and the dependence deadline; and
determine the new slack value based on the selected deadline value.

19. The apparatus of claim 18, wherein the priority order of the one or more resource-aware schedulers comprises an ordering of the one or more instructions based on their new slack value, wherein the instructions with lowest slack value have highest priority.

20. The apparatus of claim 17, wherein the one or more resource-aware schedulers are to schedule the one or more instructions such that instructions of a particular instruction type are distributed evenly among two or more resources.

21. A system comprising:
a processor to execute each of one or more ready instructions; and
a memory system, coupled to the processor, to store each of the one or more ready instructions;
wherein the instructions include a resource-aware scheduler to:
for each of one or more instructions of one or more instruction types ready to be scheduled in a given cycle in a scheduling region, determine a new slack value based on a current maximum number of the instructions that can be scheduled in the given cycle for a target processor, wherein determining the new slack value is to:
determine a minimum number of cycles needed to schedule each instruction in the scheduling region, taking resource height for each instruction into account, wherein the resource height is determined based on each resource availability for each instruction type to which each instruction belongs;
determine a dependence deadline based on a dependence height for each instruction and the minimum number of cycles, wherein the dependence height is determined based on a total height of a subgraph of a dependence graph of the scheduling region, and wherein the subgraph comprises one or more nodes to represent directly and indirectly dependent instructions of each instruction; and
determine a resource deadline based on the resource height and the minimum number of cycles;
select up to the current maximum number of instructions from those instructions ready to be scheduled in the given cycle, based on a priority order associated with the new slack value; and
schedule the selected instructions.

22. The system of claim 21, wherein the memory system comprises a Dynamic Random Access Memory (DRAM).

23. The system of claim 21, wherein the resource-aware scheduler is further to:
select as a deadline value that indicates a least number of cycles, between the resource deadline and the dependence deadline; and
determine the new slack value based on the selected deadline value.

24. The system of claim 23, wherein the priority order of the resource-aware scheduler comprises an ordering of the one or more instructions based on their new slack value, wherein the instructions with lowest slack value have highest priority.

* * * * *